United States Patent
dell'Isola et al.

(10) Patent No.: US 6,546,316 B2
(45) Date of Patent: Apr. 8, 2003

(54) TWO DIMENSIONAL NETWORK OF ACTUATORS FOR THE CONTROL OF DAMPING VIBRATIONS

(75) Inventors: Francesco dell'Isola, Rome (IT); Stefano Vidoli, Fregene (IT); Edmund Henneke, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 54 days.

(21) Appl. No.: 09/820,632

(22) Filed: Mar. 30, 2001

(65) Prior Publication Data

US 2002/0094092 A1 Jul. 18, 2002

Related U.S. Application Data

(60) Provisional application No. 60/193,444, filed on Mar. 31, 2000.

(51) Int. Cl.[7] ............................................... E04H 9/02
(52) U.S. Cl. .................. 700/280; 52/167.8; 381/71.2; 381/94.1
(58) Field of Search ..................... 52/167.8; 700/250, 700/280; 381/71.2, 94.1

(56) References Cited

U.S. PATENT DOCUMENTS

| | | | |
|---|---|---|---|
| 4,924,640 A | * 5/1990 | Suizu et al. | 52/167.2 |
| 5,107,634 A | * 4/1992 | Onoda et al. | 52/1 |
| 5,491,938 A | * 2/1996 | Niwa et al. | 52/167.1 |
| 5,816,122 A | * 10/1998 | Benning et al. | 82/1.11 |
| 6,032,552 A | * 3/2000 | Alleai | 74/574 |

FOREIGN PATENT DOCUMENTS

FR     2741274 A1 *  5/1997  ........... A63C/5/075

OTHER PUBLICATIONS

F. dell'Isola and S. Vidoli, "Continuum Modelling of Piezo-electro–mechanical Truss Beams: and application to vibration damping", Archive of Applied Mechanics, vol. 68, pp. 1–19, 1998.

F. dell'Isola and S. Vidoli, "Bending–Waves Damping in Truss Beams by Electrical Transmission Line PZT Actuators", Archive of Applied Mechanics, vol. 68, pp. 626–636, 1998.

F. dell'Isola and S. Vidoli, "Bending–Waves Damping in Truss Beams by Electrical Transmission Line PZT Actuators", Archive of Applied Mechanics, vol. 68, pp. 626–636, 1998.*

* cited by examiner

Primary Examiner—Leo Picard
Assistant Examiner—Michael D. Masinick
(74) Attorney, Agent, or Firm—Whitham, Curtis & Christofferson, P.C.

(57) ABSTRACT

An interconnected distributed network of actuator devices for the control of damping vibrations in mechanical structures. The network includes at least two actuators and at least two impedances arranged in parallel with respective actuators of the at least two actuators. A transmission line connects the parallel arrangement of the at least two actuators and the at least two impedances thereby forming a continuous distributed network.

19 Claims, 6 Drawing Sheets

TWO DIMENSIONAL NETWORK OF ACTUATORS FOR THE CONTROL OF DAMPING VIBRATIONS

CROSS REFERENCE TO RELATED APPLICATIONS

This application claims priority to U.S. Provisional Application Ser. No. 60/193,444, filed on Mar. 31, 2000, the entire contents of which are herein incorporated by reference.

DESCRIPTION

BACKGROUND OF THE INVENTION

1. Field of the Invention

The present invention generally relates to a vibration control system and, more particularly, to an interconnected distributed network of actuator devices for the control of damping vibrations in two dimensional mechanical structures.

2. Description of the Prior Art

Many industries such as the automobile industry, the aerospace industry and even the oil exploration industry expend great resources and energy to develop mechanisms for controlling vibrations in mechanical structures (e.g., automobiles, airplanes, pipelines, etc.). These vibrations are not only troublesome from a marketing and consumer satisfaction standpoint, but may equally be troublesome from a safety and environmental standpoint. That is, excess vibrations may actually cause damage to the mechanical structure leading to cracks and excessive noise, and in some extreme cases, a catastrophic failure of the mechanical structure, itself. In this latter situation, the failure of the mechanical structure may result in large expenditures in replacement costs, manufacturing costs as well as manpower and equipment. By way of one example, improper or inadequate vibration control in an oil pipeline may result in a failure of that pipeline. This, in turn, may result in an oil spill which can have a devastating environmental impact. To clean this oil spill, millions of dollars may have to be spent for rehabilitating the environment as well as replacing the pipeline, itself.

It is for the above reasons, and many others, that vibration control (e.g., damping of vibrations) is a very important aspect of engineering work when designing a mechanical structure. To minimize vibrations, engineers have devised many systems including active and passive control systems. One such active control system is piezoelectric (PZT) actuator technology. In this technology, actuators are used to dampen and control mechanical structure vibrations. It has been found, however, that these types of systems are limited in nature, and do not always provide adequate damping of the vibrations in a mechanical structure.

Two common limiting features of control systems presently used for vibration damping include:
 the differentiation between the sensing and the actuation systems, and
 the localization of PZT actuators at a small number of specific sites on the vibrating structure.
Both of these above features are limits to control efficiency. Indeed, the first factor implies the need for high power in concentrated structural regions and the need for a coordinating active system that controls the actuator action in response to the input from the sensors. On the other hand, the latter factor implies an optimal localization problem (for both actuators and sensors), the solutions of which depend on the particular mechanical vibration mode under consideration. Moreover, it is difficult to optimize the characteristics of these commonly used control systems to obtain low equivalent impedances (these are required to allow a relevant energy transformation from the mechanical to the electrical form) and efficiently drive the PZT actuators.

Some efforts have been made to overcome the first of these drawbacks. In particular, the concept of self-sensing actuators has been introduced in recent years. In this case, an ad hoc electric circuit is connected to the PZT actuator allowing for a two-fold behavior (as a sensor and as a control device). However, every actuator remains isolated and its electro-mechanical action has to be coordinated with the rest of the structure. Also, although a great number of actuators have been considered to control the shape of plates and shells, these systems still do not control the damping of vibrations.

The articles "Continuum Modelling of Piezoelectromechanical Truss Beams: an application to vibration Damping", by Francesco Dell'Isola et al., Archive of Applied Mechanics 68 (1998), pp. 1–19, Springer. Verlag, and "Bending—Waves Damping in Truss Beams by Electrical Transmission Line with PZT Actuators" Francesco Dell'Isola et al., Archive of Applied Mechanics 68 (1998), pp. 626–636, Springer Verlag discuss several differential equations which may be used to control vibrations in a one dimensional mechanical structure. In these articles only a one-dimensional case is treated with no discussion of a two-dimensional case (which is not a trivial extension). Also, these articles do not provide any specific arrangement of devices, but merely suggest an application concerning a given type of truss beam equipped with extensional actuators. Both "Continuum Modelling of Piezoelectromechanical Truss Beams: an application to vibration Damping" and "Bending—Waves Damping in Truss Beams by Electrical Transmission Line with PZT Actuators" are incorporated by reference herein in their entirety.

By way of example, FIG. 1 shows a connection arrangement of actuators for controlling extensional and torsional vibration of a one-dimensional structure (e.g., beam structure) as described in the above papers. The actuators shown in FIG. 1 are preferably PZT actuators which are formed in an electric network. In FIG. 1, a set of three PZT actuators 10a, 10b and 10c are each connected in parallel to respective impedances 12a, 12b and 12c. A transmission line with a plurality of serially connected impedances 14a, 14b, 14c connects the parallel arrangement of actuators, and capacitors. The connection arrangement shown in FIG. 1 can be expanded to include more than three parallel arrangements of actuators and impedances positioned between the serially connected impedances.

FIG. 2 shows an arrangement of interconnected piezoelectric PZT actuators disposed on a beam or one dimensional structure according to FIG. 1. In this assembled system, the PZT actuators 10a–10e are PZT patches arranged along the neutral axis of the beam 16. As noted in the above papers, the governing equations for the electric network of FIGS. 1 and 2 has the same form as the equations governing the behavior of the extensional and torsional waves in the beam-like structure (e.g., one-dimensional structure).

SUMMARY OF THE INVENTION

It is therefore an object of the present invention to provide a system for controlling the damping of vibrations in a two dimensional mechanical structure.

It is another object of the present invention to provide a system which exploits an interconnection among actuators to form a continuous electric network.

It is yet another object of the present invention to provide a system which heightens a synergic response of an interconnected set of actuators to mechanical vibrations in a two-dimensional vibrating structure.

It is still yet another object of the present invention to provide a system which exploits an internal resonance phenomenon between structural modes and electric modes to optimize control efficiency.

It is also another object of the present invention to provide a system which requires lower performances of PZT actuators.

It is an additional object of the present invention to provide a system which efficiently transforms mechanical energy into electrical energy.

It is yet an additional object of the present invention to provide a system which uses the resonance of the two-dimensional vibrating mechanical structure to transform energy between the structure to be controlled and the controlling network.

It is also an additional object of the present invention to provide a system which bypasses the problems of the optimum position of actuators and sensors.

According to the invention, a system is provided for controlling the damping of vibrations in a two dimensional mechanical structure. The system includes at least two actuating devices and a transmission line connecting the at least two actuating devices. The transmission line and the at least two actuating devices form a continuous distributed network which exploits a resonance of a two-dimensional vibrating structure to transform mechanical energy into electrical energy and transfer the electrical energy along the transmission line and between the at least two actuating devices. The actuating devices may include a parallel arrangement of piezoelectric (PZT) actuators and impedances.

In another aspect of the present invention a system for damping a vibrating body is provided. The system includes at least two actuators and at least two impedances arranged in parallel. A transmission line connects the parallel arrangement of the actuators and the impedances to form a continuous distributed network. The governing equations for the continuous distributed network of the parallel arrangement of the actuators and the impedances has substantially a similar form as equations governing a behavior of extensional and torsional waves in the two-dimensional vibrating structure.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
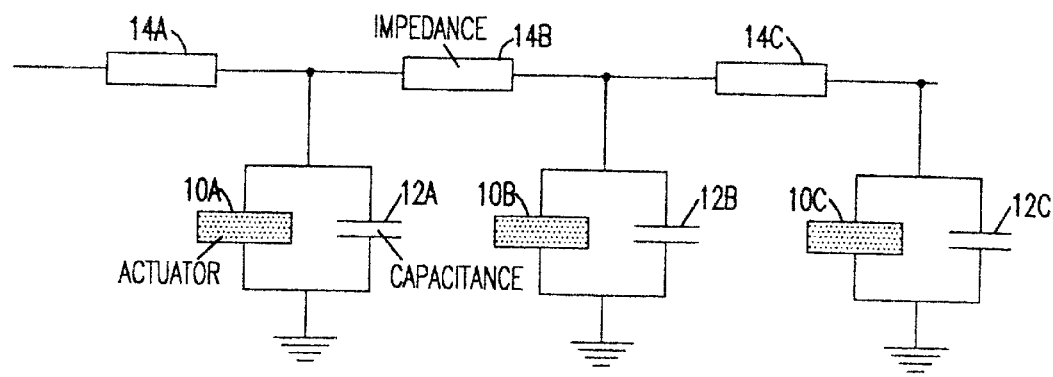
FIG. 1 shows a connection arrangement of actuators for controlling extensional and torsional vibration of a beam structure.
Figure 2:
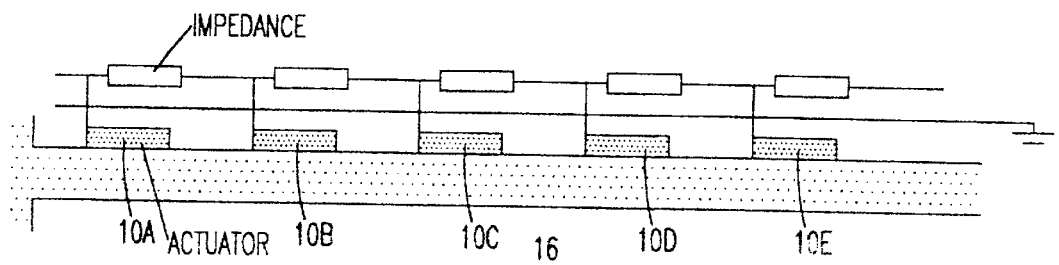
FIG. 2 shows an arrangement of interconnected piezoelectric (PZT) actuators disposed on a beam.

The present invention is directed to an interconnected distributed network of control devices for controlling the damping of vibrations in mechanical structures. It should be realized by those of ordinary skill in the art that the control system of the present invention is not limited to the use in any specific mechanical structure and may equally be used throughout a broad spectrum of applications such as, for example, automobiles, airplanes, satellites, pipelines and other two-dimensional mechanical structures which exhibit the need for vibration control. For illustration purposes only, the control system of the present invention will be described with reference to a plate-like structure which is representative of a two-dimensional mechanical structure.

In general, the control system of the present invention exploits an interconnection among actuators which heightens their synergic response to mechanical vibrations. The control system is more specifically based on the interconnection of a set of actuators to form a continuous electric network on a two-dimensional structure. The properties of the interconnected network of actuators is chosen to exploit an electro-mechanical self-resonance which efficiently transforms mechanical energy into electrical energy. This transformation effect is proven by studying the spectral properties of the differential operators governing the evolution of the mechanical/electrical energy spectrum.

It is further noted that the present invention introduces the concept of "parallelism" between mechanical structures and electric control systems. A structure, for example, a plate-like structure, is controlled by a uniform distribution of actuators connected through an electric transmission network. An internal resonance phenomenon between structural modes and electric modes is then exploited to optimize the control efficiency. The resonance of the control network is thus used to transfer energy between two different continuous systems; namely, the resonance is used to transform energy between the structure to be controlled and the controlling network. The transfer of energy by this phenomenon has not been used previously to control structural vibrations. A suitable tuning of the net impedance provides for the electro-mechanical coupling and for efficient energy transfer.

It is further noted that the interconnected distributed network of actuators of the present invention has at least two practical advantages:

the system of the present invention requires lower performances of the actuators (PZT actuators); and the system of the present invention produces an electro-mechanical interaction based on the internal resonance phenomena between the modes of the integrated electro-mechanical system.

This latter advantage allows for a strong control action and shorter times to transfer the energy between electrical and mechanical forms. Moreover, the system of the present invention bypasses the problems of the optimum position of actuators and sensors positioned on a mechanical structure, and is capable of managing all the mechanical modes through the same distributed configuration of its collocated actuators.

Interconnected Distributed Control System of the Present Invention

Figure 3:
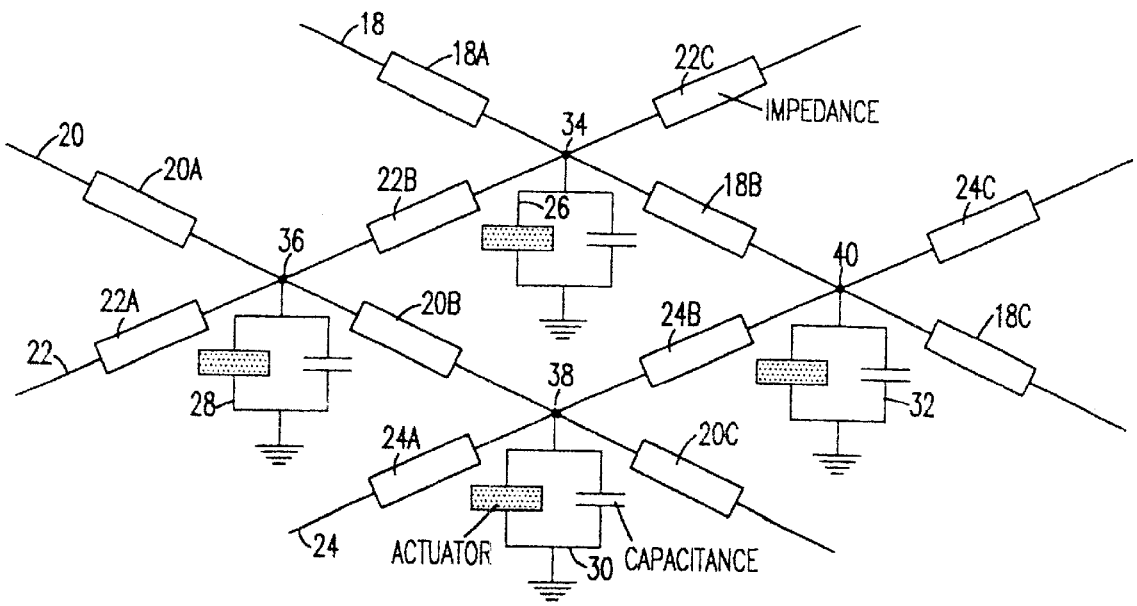
FIG. 3 shows a connection arrangement of actuators for controlling vibration of a plate-like structure.

Now understanding the above, FIG. 3 shows an example of a connection arrangement of actuators for controlling vibration of a two-dimensional structure (e.g., plate-like structure) of the present invention. It is first noted, and discussed in greater detail below, that the vibrations of the plate-like structure are governed by double Laplacian equations and that the extension of the connection arrangement of the PZT actuators to a two-dimensional structure is not a trivial exercise. Secondly, it is noted that the governing equations for the resulting electric network of FIG. 3 (and other two-dimensional structures) should, in embodiments, be similar to the governing equations for the two-dimensional vibrating mechanical structure. It is thirdly noted that the connection arrangement shown in FIG. 3 is but one connection arrangement provided by the present invention and that other connection arrangements using an interconnection of actuators for two-dimensional structures is also contemplated by the present invention. These connection arrangements may include arrangements shown, for example, in FIGS. 4, 5 and 10–14.

As seen in the arrangement of FIG. 3, a uniform distribution of actuators over a surface of the plate-like structure is shown. In particular, a crossing pattern of four transmission lines 18, 20, 22 and 24 are provided in a grid format. Each of the transmission lines 18, 20, 22, 24 include respective impedances 18a–18c, 20a–20c, 22a–22c and 24a–24c. These impedances may be simply provided by the transmission line, itself. A parallel arrangement of actuators and impedances generally depicted as 26, 28, 30 and 32 (as described with reference to FIG. 1) are connected at respective nodes 34, 36, 38 and 40 of the crossing transmission lines.

Figure 4:
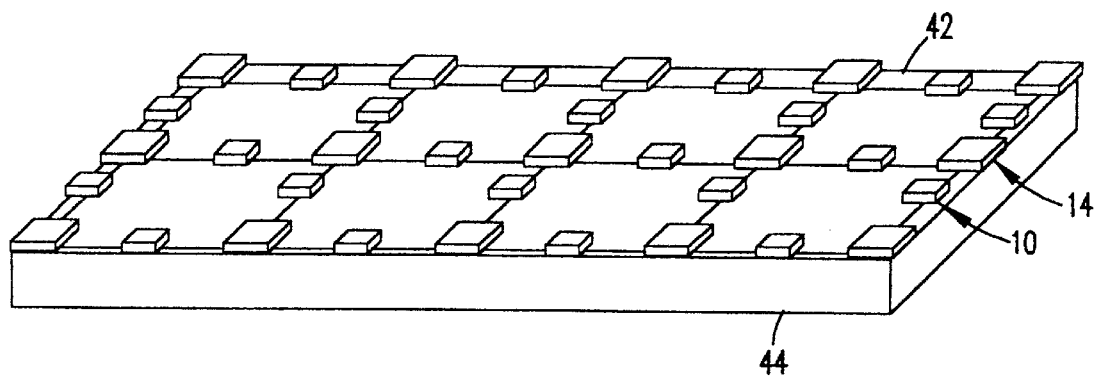
FIG. 4 is a schematic diagram showing a connection arrangement of actuators for a plate-like structure.
Figure 5:
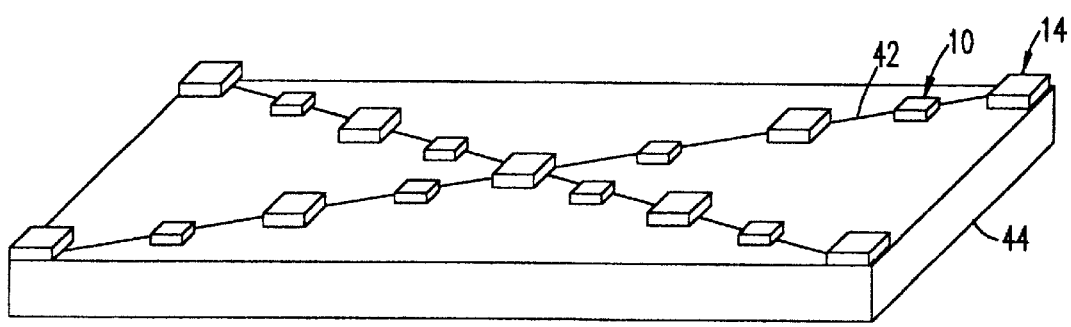
FIG. 5 is a second schematic diagram showing a connection arrangement of actuators for a plate-like structure.

FIGS. 4 and 5 show two variations of connection arrangements of actuators for the plate-like structure. In FIGS. 4 and 5, the actuators (depicted as reference numeral 10) are connected between impedances (depicted as reference numeral 14) via a transmission line 42. In FIG. 4, the actuators 10 and impedances 14 are disposed on the plate-like structure 44 in a grid-like format. On the other hand, the actuators 10 and impedances 14 of FIG. 5 are arranged along the main diagonal of the plate-like structure 44. In either scenario, it is preferred (but not critical) to provide a uniform distribution of the actuators 10 over the plate-like structure 44. By using the internal resonance phenomena between the plate-like structure and the interconnected actuator network of FIGS. 4 and 5, a control of the plate-like structure can be accomplished thereby providing a damping to the vibration thereof.

Mathematical Models and Numerical Simulations of the Present Invention

An equivalent continuum model using modern homogenization techniques is provided for each of the structures and relative connections described above. These sets of equations and associated numerical simulations are discussed below.

In the arrangement of FIG. 1 for a beam-like structure, the extension (or torsional) vibrations are provided by the following equations:

$$-\alpha u'' + \ddot{u} - \gamma \phi' = 0$$

$$-\beta \phi'' + \phi + \delta \dot{\phi} + \gamma \dot{u} = 0$$

Here $u$ and $\phi$, respectively, denote the axial displacement (or twist) in the beam and the potential drop along the electric connection network. The system parameters are represented by $\alpha$, $\beta$, $\delta$ and $\gamma$. Furthermore, $\beta$ is proportional to the net-inductance (i.e., the imaginary part of the electric impedance connecting the actuators) and $\delta$ is proportional to the net-resistance. It is further noted that a dot above any term denotes a time derivative and a prime denotes a spatial derivative.

The equations for bending vibrations of the beam are:

$$\alpha v^{IV} + \ddot{v} - \gamma \phi'' = 0$$

$$-\beta \phi'' + \phi + \delta \dot{\phi} + \gamma \dot{v}'' = 0$$

Here $v$ and $\phi$, respectively, denote the transverse displacement field in the beam and the potential drop along the electric connection net. Again, $\alpha$, $\beta$, $\delta$ and $\gamma$ are system parameters, and $\beta$ and $\delta$ are proportional to the electrical inductance and resistance, respectively.

However, to extend this concept to a two dimensional structure is not trivial as shown below. It is first noted that the equations which govern the vibrations of a two-dimensional vibrating structure are complex equations which are not easily extendable from the equations of a one-dimensional vibrating structure. For example, in the arrangement of FIG. 3 for the plate-like structure, the equations for bending vibrations are as follows:

$$\alpha \Delta \Delta v + \ddot{v} - \gamma \Delta \dot{\phi} = 0$$

$$-\beta \Delta \phi + \phi + \delta \dot{\phi} + \gamma \Delta \dot{v} = 0$$

Here $v$ and $\phi$, respectively, denote the transfer displacement field in the plate-like structure and the potential drop in the electric connection network.

In all these cases, once the equations have been discretized in space (for instance by means of a Finite Element method), a system of ordinary differential equations are obtained. These ordinary differential equations are represented as follows:

$$Au + \ddot{u} - C\ddot{o} = 0$$

$$B\ddot{o} + \ddot{o} + C\dot{u} = D\dot{o}$$

where $v$ and $\phi$ denote, respectively, the vectors of mechanical displacements and potential drops. Also, A, B, C and D are matrices related to the system parameters. Thus, the numerical simulations shown in each of the aforementioned scenarios provide the same qualitative results.

Figure 6:
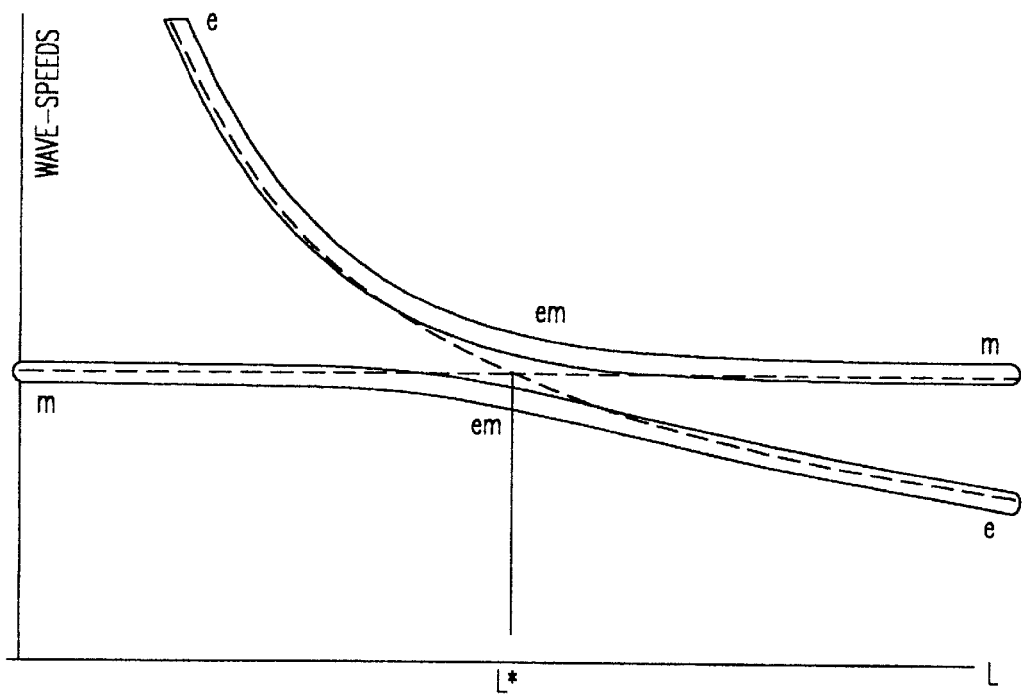
FIG. 6 shows wave speeds plotted as functions of net-inductance L for the connection arrangement of FIG. 3.

FIG. 6 shows the wave speeds plotted as functions of the net-inductance L for the connection arrangement of FIG. 3. In making the calculations for FIG. 6 (and FIGS. 7–9), it was assumed that the distribution of PZT actuators and impedances could be modeled as a continuum. The wave propagation of FIG. 6 is for a non-dissipative case (i.e., when the net-impedance is purely inductive and D=0) The "m", "e" and "em" subscripts are provided to signify the nature of the associated wave-forms (mechanical and electrical, respectively). As seen, there is a range of net-inductance (namely around L=L*) where all the wave-forms have components of comparable energy. In this range there is no wave purely mechanical or purely electrical. It should be noted that when the net-inductance is tuned to this critical value, L*, the electro-mechanical coupling is maximum.

Figure 7:
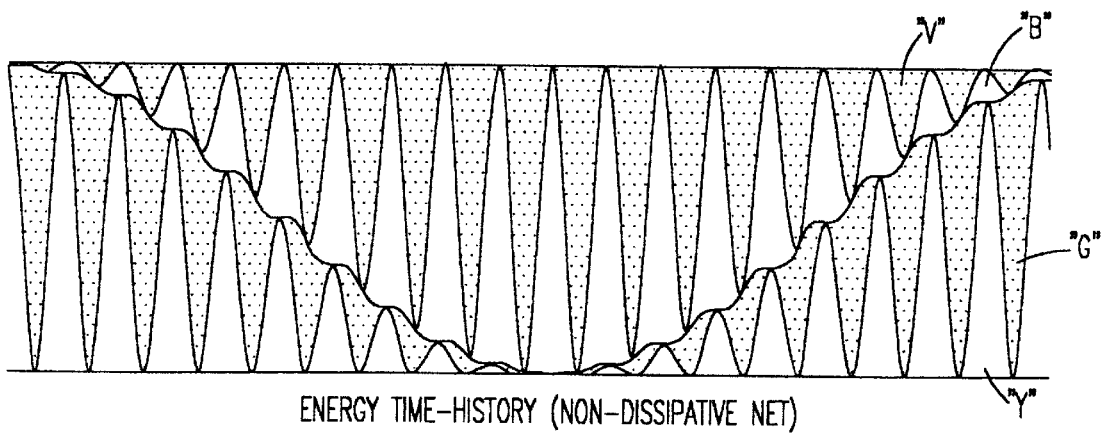
FIG. 7 shows a time-evolution starting from mechanical data.

FIG. 7 shows a time-evolution starting from mechanical data for the connection arrangement of FIG. 3. Starting from purely mechanical initial data gives rise to a cyclic exchange of energy between the mechanical and the electrical forms. Here, area "Y" denotes the mechanical elastic energy,
area "G" denotes the kinetic energy,
area "B" denotes the electric inductive energy and
area "V" denotes the electric capacitive energy.

The total energy shown in FIG. 7 is constant because it considers the non-dissipative case. It is also important to note that all of the mechanical energy can be absorbed in the electric circuit without dissipation with use of the present invention.

Figure 8:
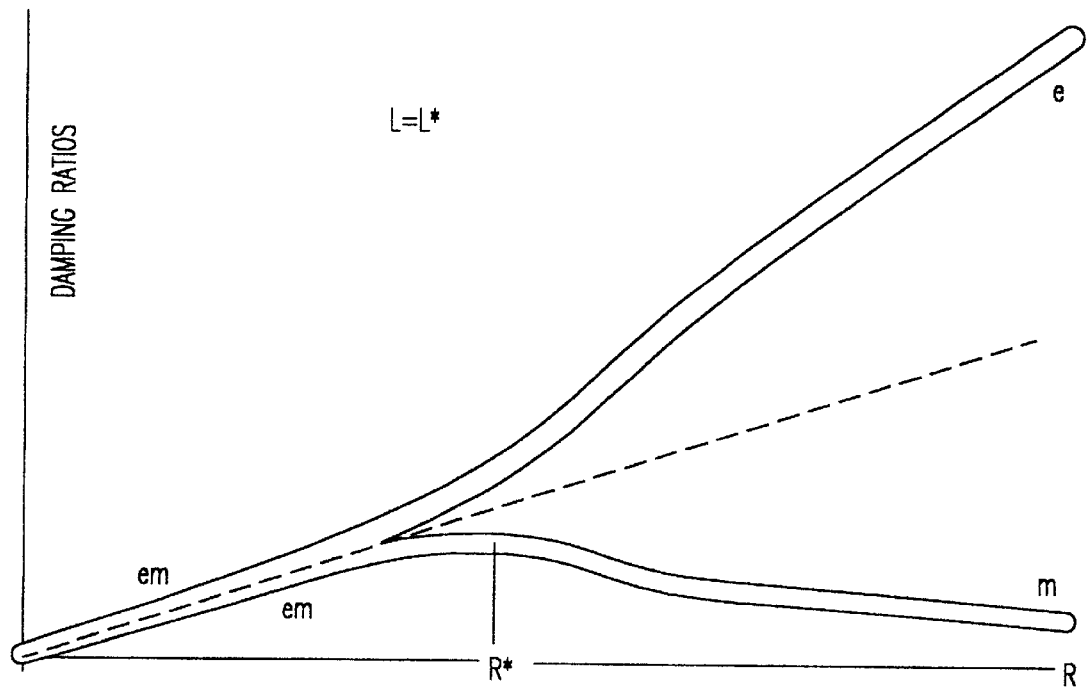
FIG. 8 shows damping ratios drawn as functions of the resistance for a fixed value of net-impedance L* for the connection arrangement of FIG. 3.

FIG. 8 shows the dimensionless damping ratios of the connection arrangement of FIG. 3 drawn as functions of the resistance for a fixed value of net-impedance L*. It should be realized by those of ordinary skill in the art that the damping ratios shown in FIG. 8 can be analyzed when considering a non-vanishing resistance R. Again, the subscripts "m", "e" and "em" signify the nature of the associated wave-forms (mechanical and electrical, respectively). The presence of a maximum value for the lower branch of the damping ratios is evident in FIG. 8, and thus the net-resistance should be large enough to dissipate energy but small enough to allow the exchange of mechanical and electrical energy.

Figure 9:
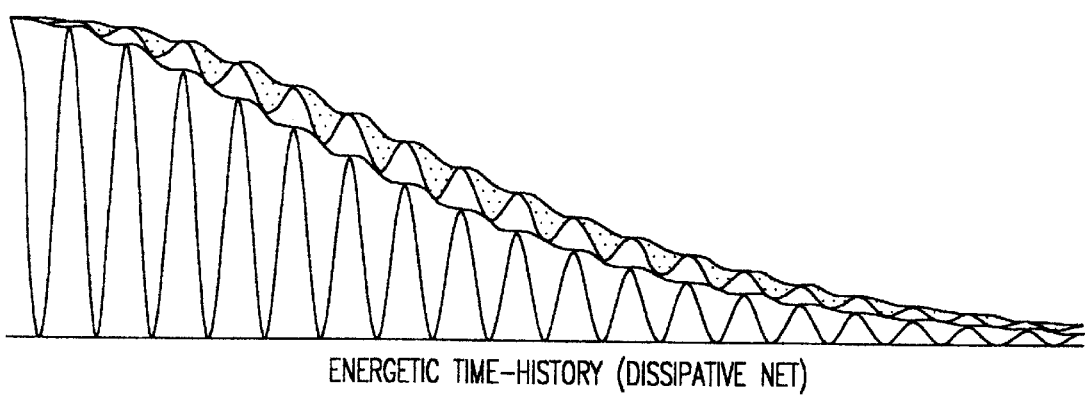
FIG. 9 shows a time evolution of mechanical energy to electrical energy.

FIG. 9 shows a time evolution of mechanical energy to electrical energy for the connection arrangement of FIG. 3. As seen in FIG. 9, when values of the net electric parameters are optimized, the time-evolution diagram beginning with initial mechanical energy shows a dissipation of energy that, once transformed into electrical form, cannot be transformed back to mechanical energy. Representations similar to FIGS. 6–9 may also be provided for other two-dimensional mechanical structures.

Figure 10:
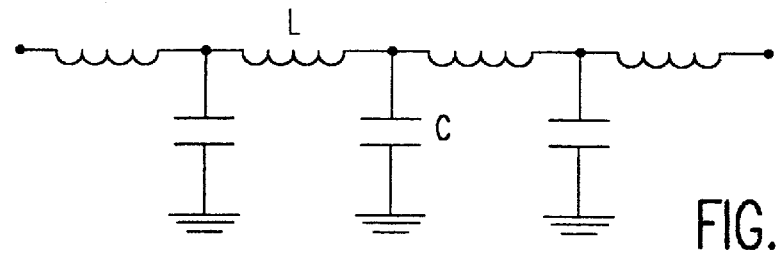
FIGS. 10–14 show several connection arrangements of actuators for controlling vibrations in a mechanical structure.
Figure 11:
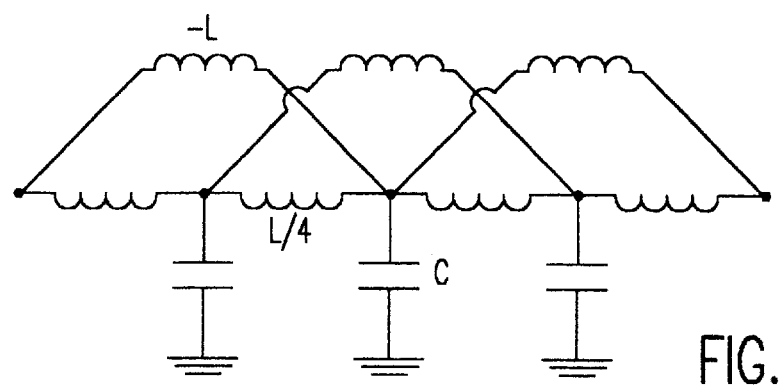
Figure 12:
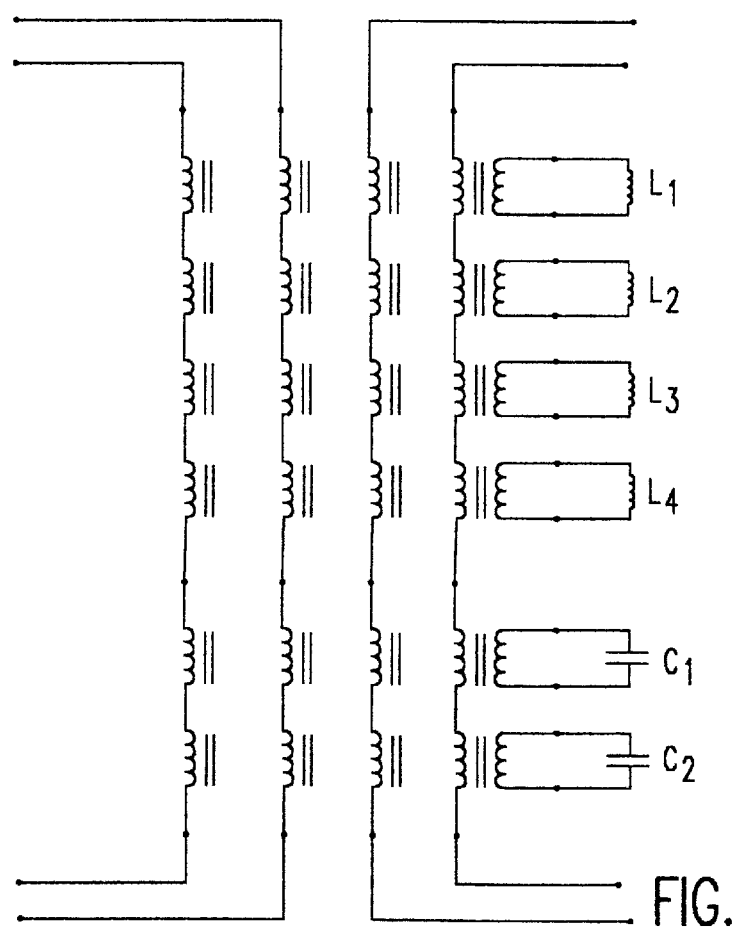
Figure 13:
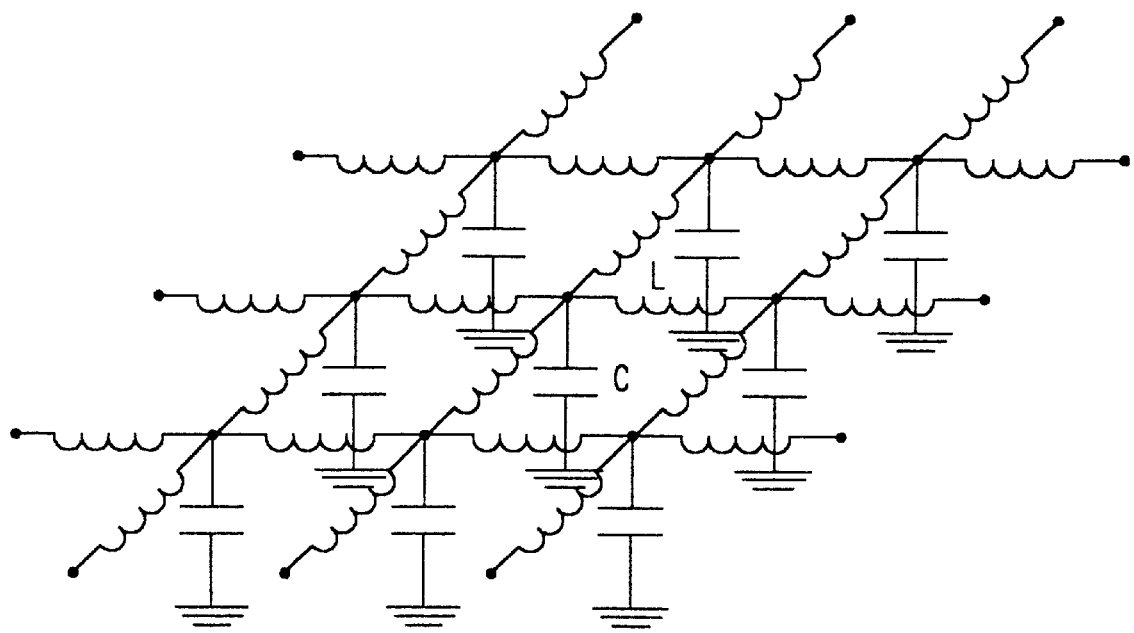
Figure 14:
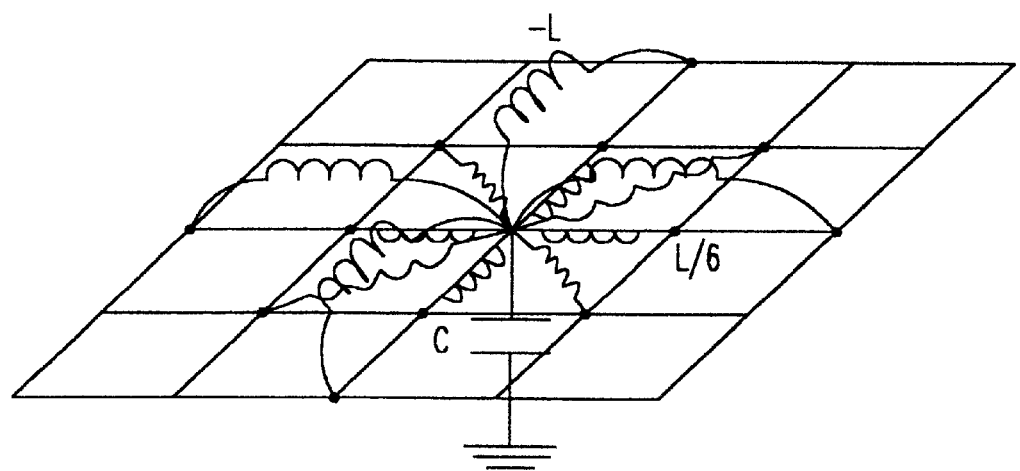

FIGS. 10–14 show several electrical interconnections used in practical applications in accordance with the teachings of the present invention. FIG. 10 shows a connection row of PZT actuators which behave electrically as capacitors. The connection of FIG. 10 is governed by D'Alembert wave equations. FIG. 11 is a connection of PZT actuators governed by the vibration equation of Elastica. FIG. 12 is an electrical circuit connected in cascade where the capacitors are the electric model of the PZT actuators. The circuit of FIG. 12 is also governed by the vibration equation of Elastica. FIG. 13 is a global connection scheme of a distributed set of PZT actuators governed by the bi-dimensional D'Alembert equations. FIG. 14 is a module for an electric circuit governed by the vibration equations of Hirchhoff-Love plates. The circuit connection of the PZT actuators represented again as capacitors.

Method of Controlling and Damping of Vibrations in a Mechanical Structure

By way of example, in using the connection arrangement of FIG. 3, a vibration of the mechanical structure will cause the PZT actuators to produce a voltage (load). This load will then be used to damp the vibration of the mechanical structure, itself. Any excess load may be stored in the respective capacitor which is arranged in parallel with the PZT actuator. The respective impedances may also be used as an additional load source in order to smooth the voltage and hence provide a more stable control of damping of the mechanical structure by any of the PZT actuators. By using the interconnection of actuators there is no need to provide an external power supply in simple damping systems.

The loads between each of the PZT actuators (and respective capacitor) may also be transferred via the serially arranged transmission line. This results when the potential of one PZT actuator and capacitor arrangement is higher than another PZT actuator and capacitor arrangement (caused by a higher vibration or resonance at that region). In this manner, the energy from the vibrating mechanical structure is not only transformed to an electrical energy but may also be transferred through the transmission line in order to provide a control of damping of the vibration throughout the entire mechanical structure.

Conclusion

Control of the damping of vibrations of structural panels is a major issue in the automobile, aeronautical and aerospace industries, as well as other industries. A suitable interconnection of the actuators (to form an electrical network with transmission properties mathematically similar to the equations governing vibrations of the panel) allows for a distributed, more efficient control action. The interconnection of the actuators provided by the present invention requires lower performances of the actuators, and is able to control all mechanical modes without any modification.

The numerical simulations also show significant improvement of the control performances (e.g., the time needed to dampen the vibrations is upwards of ten times lower than that for prior art control devices). Moreover, in the case of simple damping, the system of the present invention does not require an external power supply but instead uses the energy transformed from mechanical to electrical form. This provides a great advantage over prior art systems which require energy from an external source to obtain the proper damping of the vibrations of a mechanical structure. It is further noted that the connection arrangement of the actuators in a two-dimensional mechanical structure to control damping of the vibrating structure in accordance with the present invention is not a trivial extension of a one-dimensional mechanical structure.

Other aspects and features of the present invention can be obtained from a study of the drawings, the disclosure, and the appended claims.

We claim:

1. A system for damping vibrations, the system comprising:
    at least two actuating devices; and
    a transmission line connecting the at least two actuating devices, the transmission line providing an impedance, wherein the transmission line and the at least two actuating devices form a continuous distributed network which exploits a resonance of a vibrating two dimensional structure to transform mechanical energy into electrical energy and transfer the electrical energy along the transmission line and between the at least two actuating devices.

2. The system of claim 1, wherein the at least two actuating devices are distributed uniformly over a two dimensional mechanical structure.

3. The system of claim 1, wherein the at least two actuating devices transfer the energy between a first and a second actuator of the at least two actuating devices along the transmission line in order to control vibrations at remote regions of the vibrating two dimensional structure.

4. The system of claim 1, wherein the continuous distributed network of the at least two actuating devices produces an electro-mechanical interaction based on the resonance of the vibrating two dimensional structure between modes of actuators of the at least two actuating devices and the vibrating two dimensional structure.

5. The system of claim 1, wherein the continuous distributed network of the at least two actuating devices manages all the mechanical modes of the vibrating two dimensional structure through a same distributed network of the at least two actuators.

6. The system of claim 6, wherein the at least two actuating devices are piezoelectric actuators.

7. The system of claim 6, wherein the at least two actuating are piezoelectric actuators.

8. The system of claim 7, wherein the at least two actuating devices and the at least two impedances are three or more actuators and three or more impedances arranged in respective parallel arrangements.

9. The system of claim 6, wherein the impedance of the transmission line is placed between the parallel arrangements of the at least two actuating devices and the at least two impedances.

10. The system of claim 1, wherein the continuous distributed network forms a lattice pattern on the vibrating two dimensional structure.

11. The system of claim 1, wherein the continuous distributed network forms along main diagonals of the vibrating two dimensional structure.

12. The system of claim 1, wherein the at least two actuating devices includes piezoelectric (PZT) patches arranged along the vibrating two dimensional structure.

13. A system for damping a vibrating body, comprising:
at least two actuators;
at least two impedances arranged in parallel with respective actuators of the at least two actuators; and
a transmission line connecting the parallel arrangement of the at least two actuators and the at least two impedances forming a continuous distributed network for controlling vibration in a two dimensional mechanical structure.

14. The system of claim 13, wherein the at least two actuators are distributed uniformly over said two dimensional mechanical structure.

15. The system of claim 13, wherein the continuous distributed network exploits the resonance of the vibrating structure to transform energy between the vibrating two dimensional structure and the at least two actuators in the continuous distributed network.

16. The system of claim 15, wherein the transformed energy is transferred between a first and a second actuator of the at least two actuators along the transmission line in order to control vibrations at remote regions of the vibrating two dimensional structure.

17. The system of claim 13, wherein the at least two actuators manages all the mechanical modes of the vibrating two dimensional structure through the same distributed network.

18. The system of claim 13, wherein the at least two actuators are piezoelectric actuators.

19. The system of claim 13, further comprising an impedance within the transmission line which is positioned between the parallel arrangements of the at least two actuators and the at least two impedances.

* * * * *